United States Patent
Yabe et al.

(10) Patent No.: US 7,170,898 B2
(45) Date of Patent: Jan. 30, 2007

(54) RELAY APPARATUS

(75) Inventors: Toshiyasu Yabe, Chiba (JP); Atsuko Murozumi, Ichikawa (JP); Nobuyuki Ikeda, Koshigaya (JP); Takashi Koganemaru, Funabashi (JP)

(73) Assignee: NTT DoCoMo, Inc., Tokyo (JP)

( * ) Notice: Subject to any disclaimer, the term of this patent is extended or adjusted under 35 U.S.C. 154(b) by 942 days.

(21) Appl. No.: 10/239,768

(22) PCT Filed: Nov. 21, 2001

(86) PCT No.: PCT/JP01/10169

§ 371 (c)(1),
(2), (4) Date: Sep. 23, 2002

(87) PCT Pub. No.: WO02/43330

PCT Pub. Date: May 30, 2002

(65) Prior Publication Data

US 2003/0048796 A1  Mar. 13, 2003

(30) Foreign Application Priority Data

Nov. 24, 2000 (JP) .............................. 2000-358309

(51) Int. Cl.
*H04L 12/28* (2006.01)
(52) U.S. Cl. ...................................... 370/401; 370/338
(58) Field of Classification Search ...................... None
See application file for complete search history.

(56) References Cited

U.S. PATENT DOCUMENTS 6,128,664 A    10/2000  Yanagidate et al.
6,473,411 B1 *  10/2002  Kumaki et al. ............. 370/331
6,667,974 B1 *  12/2003  Shigeta ....................... 370/389
6,754,328 B1 *   6/2004  Takahashi ............... 379/220.01

(Continued)

FOREIGN PATENT DOCUMENTS

JP    H06-261078 A    9/1994

(Continued)

OTHER PUBLICATIONS

NTT DoCoMo Technical Journal vol. 7, No. 2, dated Jul. 1999, "Special Issue on I-Mode Service Network System", 6 pages; Authors: Mitsuaki Hanaoka, Shinobu Kaneshige, Noriaki Hagiya, Kimihiro Ohkubo, Kenichi Yakura, and Yoko Kikuta.

*Primary Examiner*—Phirin Sam
(74) *Attorney, Agent, or Firm*—Brinks Hofer Gilson & Lione

(57) ABSTRACT

When a gateway server GWS receives an access demand to an IP server from a cellular phone MS via a mobile packet communication network MPN, the gateway server acquires information corresponding to a hostname included in the access demand from a primary conversion table T1. When the obtained information is a wide area IP address, gateway server GWS relays the access demand to a IP server on the Internet INET on the basis of the wide area IP address. When the obtained information is identification of a closed area network, gateway server GWS further acquires a closed area IP address corresponding to the hostname included in the access demand and relays the access demand to a IP server on the basis of the closed area IP address in the LAN corresponding to the identification of the closed area network.

4 Claims, 14 Drawing Sheets

U.S. PATENT DOCUMENTS

2002/0035624 A1 3/2002 Kim

FOREIGN PATENT DOCUMENTS

| | | |
|---|---|---|
| JP | H10-290232 A | 10/1998 |
| JP | H11-122301 A | 4/1999 |
| JP | H11-154966 A | 6/1999 |
| JP | 2000-216887 A | 8/2000 |
| KR | 2002-0022317 | 3/2002 |

* cited by examiner

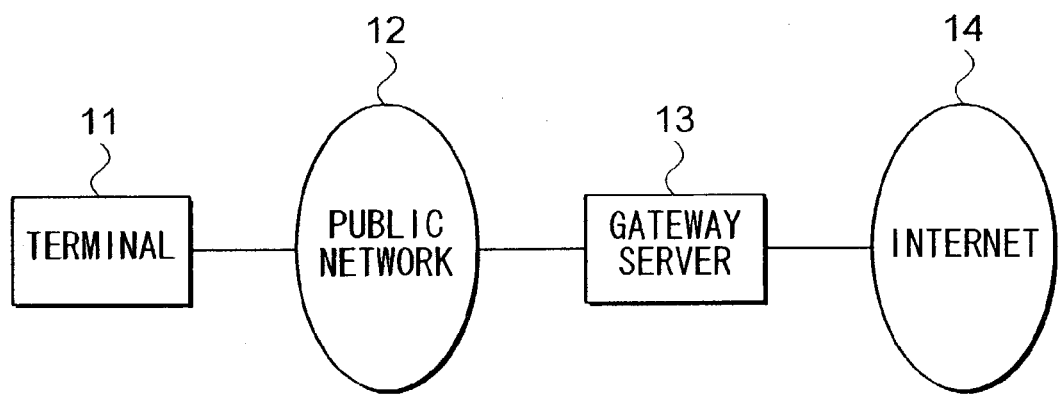

| HOST NAME | CLOSED AREA IP ADDRESS |
|---|---|
| aaaaa | sss.sss.sss.sss |
|  |  |

| HOST NAME | ADDRESS INFORMATION | EXPIRATION TIME |
|---|---|---|
| ip1.lan1.ccccc.co.jp | CLOSED AREA IDENTIFICATION CID1 | — |
| ip1.lan2.ccccc.co.jp | CLOSED AREA IDENTIFICATION CID2 | — |
| ip2.lan2.ccccc.co.jp | CLOSED AREA IDENTIFICATION CID2 | — |
| keitai.aaaaa.co.jp | xxx.xxx.xxx.xxx | — |
|  |  |  |

| HOST NAME | ADDRESS INFORMATION |
|---|---|
| ip1.lan1.ccccc.co.jp | ppp.ppp.ppp.ppp |
|  |  |

| HOST NAME | ADDRESS INFORMATION |
|---|---|
| ip1.lan2.ccccc.co.jp | ppp.ppp.ppp.ppp |
| ip2.lan2.ccccc.co.jp | qqq.qqq.qqq.qqq |
|  |  |

| HOST NAME | ADDRESS INFORMATION | EXPIRATION TIME |
|---|---|---|
| ip1.lan1.ccccc.co.jp | CLOSED AREA IDENTIFICATION CID1 | — |
| ip1.lan2.ccccc.co.jp | CLOSED AREA IDENTIFICATION CID2 | — |
| ip2.lan2.ccccc.co.jp | CLOSED AREA IDENTIFICATION CID2 | — |
| keitai.aaaaa.co.jp | xxx.xxx.xxx.xxx | |
| www.bbbbb.com | yyy.yyy.yyy.yyy | 2000/07/30 13:15 |

RELAY APPARATUS

TECHNICAL FIELD

The present invention relates to a relay center in a data communication system in which a terminal connected to a network is able to communicate with a host on either a wide area network or a closed area network via the relay center and either one of the networks.

RELATED ART

FIG. 1 shows the configuration of a data network system for providing users with an Internet connecting service. In the system, a terminal 11 can establish a dial-up connection with a gateway server 13 via a public network 12, and also establish a Point to Point Protocol (PPP) connection between the terminal and gateway server 13. The terminal is then able to access the Internet 14 through the communication link in accordance with Transmission Control Protocol/Internet Protocol (TCP/IP).

In accessing a host connected to the Internet 14, terminal 11 is able to specify the destination host by designating the Internet Protocol address which is a unique world-wide (hereafter, referred to as wide area IP address). In general way, however, the terminal specify the destination host by the host name of it in a predetermined domain name system. When the host name of the destination is designated by terminal 11, gateway server 13 transmits an inquiry regarding an IP address of the host name to the Internet 14, obtains a wide area IP address corresponding to the host name, and notifies the address to terminal 11. In the case that the corresponding wide area IP is not found, gateway server 13 notifies the fact to terminal 11. In the description, information specifying the host is referred to as "host name", regardless of whether the information includes a domain name or not.

When gateway server 13 obtains a wide area IP address in response to an inquiry including a hostname, it correlates and stores the host name and the obtained wide area IP address in a cache for a predetermined period of time, to prepare for a subsequent inquiry in which the same host name is designated. Specifically, when gateway server 13 receives an inquiry including a host name, the gateway server searches for a wide area conversion table in which the host names of hosts on the Internet 14, their wide area IP addresses, and their expiration times are correlated (Refer to FIG. 2). In the case that the host name and the wide area IP address of the host designated by the host name are stored in the table, the gateway server obtains the wide area IP address from the table; whereas if the wide area IP address has not been stored, the gateway server makes an inquiry through Internet 14 to obtain the address.

In the case that gateway server 13 transmits an inquiry and in response obtains a new record, it adds the new record to the wide area conversion table. When a preset holding term for a record on the gateway server expires, the record is deleted. A holding time is set since a relationship between a host name and an IP address may change in time.

On the other hand, a communication system as shown in FIG. 3 is generally used. In the communication system, terminal 21 establishes a dial up-connection to a remote connecting server 24 inside LAN 23 through public network 12, and terminal 21 establishes a PPP connection between the terminal and the remote connecting server. Terminal 21 can access each host on LAN 23 through the connection thus established.

In LAN 23 utilizing TCP/IP as communication protocol, an IP address identified uniquely inside LAN 23 (hereafter, referred to as closed area IP address) is assigned to each of a host on LAN 23, including terminal 21 connected to the LAN. In a LAN which is larger than a determined scale, a host name is provided for each host and a communication destination is designated by the host name. The requirement for naming of a host name is different from that used in Internet 14; and a host name of a host in LAN 23 is required to be unique only inside the LAN. In a communication system in which a destination host is designated by a host name, a closed area conversion table correlating host names of hosts and closed area IP addresses assigned to the hosts is provided in remote connecting server 24 for example; and the remote connecting server processes an inquiry about a closed area IP address by designating the host name.

It is possible to incorporate the function of both terminal 11 and terminal 21 in the same terminal. When a user accesses a network using such a terminal, the user selects a communication destination. However, to access to the desired network, the user of the terminal must select a destination telephone number, which is inconvenient for the user.

To overcome this disadvantage, it is possible to provide a communication system as shown in FIG. 5. In this communication system, a router 25 having a wide area IP address is provided in LAN 23, and the router is connected to gateway server 13 through a dedicated line 26. A terminal 51 can access either LAN 23 or Internet 14 via gateway server 13.

In this case, when terminal 51 transmits an inquiry designating a host name of a host inside LAN 23, gateway server 13 transmits the wide area IP address of router 25 in response to the inquiry. Furthermore, the packet transmitted from terminal 51 to gateway server 61 will be routed inside LAN 23 on the basis of the destination host name designated in the packet.

However, when LAN 23 provides service only to terminal 51, router 25 must be accessed by terminal 51, and access from Internet 14 must be precluded. It is difficult for router 25 to determine whether an access-origin is terminal 51 or another terminal on the Internet. Because, the packet routed from gateway server 13 to router 25 is a packet in accordance with TCP/IP, to be able to receive access from terminal 51 while precluding access from Internet 14, router 25 is required to have highly enhanced function, and the execution of such functions place a great burden on an administrator of LAN 23. In addition, since a packet sent from the Internet 14 to LAN 23 runs through dedicated line, there is also a disadvantage that traffic of dedicated line 26 that LAN 23 uses for providing the service to terminal 51 increases.

Thus, as shown in FIG. 6, it is possible to connect LAN 23 and gateway server 61 that has the function of the host inside LAN 23 in addition to the function of gateway server 13 through a dedicated line, and to perform access from terminal 51 to LAN 23 within a closed area. When terminal 51 inquires about the host name of a host inside LAN 23, gateway server 61 transmits its own wide area IP address in response to the inquiry. In a subsequent access, the packets transmitted from terminal 51 to gateway server 61 will be routed inside LAN 23, including the gateway server, on the basis of the destination host name designated in the packets. In this system, since gateway server 61 rejects an access from the Internet 14 to LAN 23, the available band of dedicated line 26 will not be narrowed as a result of access from Internet 14. Further, since gateway server 61 can determine whether such access is from terminal 51 or from a terminal on Internet 14, there is no need for highly enhanced access control.

However, the problem in the communication system shown in FIG. 6 is that the time it takes to solve an inquiry about a host name when terminal 51 accesses LAN 23 or the Internet 14. More specifically, when responding to the inquiry, not only a search of a wide area conversion table, but also of a closed area conversion table is required, and thus a processing demand on gateway server 61 increases.

DISCLOSURE OF INVENTION

An object of the present invention is to provide a relay apparatus that provides a high quality information service to a user without imposing a burden on the information service provider of closed area network even when both closed area network and wide area network are included.

The relay apparatus of the present invention comprises a data communication system in which a terminal connected to a network is able to communicate with a host on either a wide area network or a closed area network via the relay center and either one of the networks.

The relay apparatus in the present invention provides (a) a storage unit for storing a primary conversion table having a record correlating a hostname of a host on the wide area network with a wide area address and a record correlating a hostname of a host on the closed area network with a closed area network identification, and a secondary conversion table having a record correlating a hostname of a host on the closed area network with a closed area address of the host in the closed area network, (b) a receiver for receiving an access demand to a host from the terminal through the network, (c) a first acquiring unit for acquiring information corresponding to a hostname included in the received access demand from the primary conversion table, (d) a wide area relay unit for, when information acquired by the first acquiring unit is a wide area address, relaying the access demand to a host specified by the wide area address, (e) a second acquiring unit for, when information obtained by the first acquiring unit is an closed area network identification, acquiring a closed area address in the closed area network, the closed area address corresponding to the hostname included in the access demand from the secondary conversion table, (f) a closed area relay unit for relaying the access demand to the host specified by the identification acquired by the first acquiring unit and the closed area address acquired by the second acquiring unit.

3. More preferably, the storage device stores a record correlating the host name of the host on the closed area network with the closed area network identification in an area which is first subjected to retrieval, and stores the record correlating the hostname of the host on the wide area network with the wide area address in an area which is next subjected to retrieval. The terminal is a cellular phone, for example.

BRIEF DESCRIPTION OF THE DRAWINGS

FIG. 1 is a block diagram showing a configuration of an Internet connection system, which has been proposed in the past.

FIG. 2 is a diagram showing a data configuration of a wide area conversion table used in the Internet connection system.

FIG. 13 is a diagram showing an example of the data configuration of first conversion table T1 stored in gateway server GWS.

FIG. 14 is a diagram showing an example of the data configuration of second conversion table T21 stored in gateway server GWS.

FIG. 15 is a diagram showing an example of the data configuration of second conversion table T22 stored in gateway server GWS.

FIG. 21 is a diagram showing the contents of first conversion table T1 stored in gateway server GWS.

BEST MODE FOR CARRYING OUT THE INVENTION

Hereinbelow, description will be given with respect to one embodiment of the present invention with reference to the drawings.

(1) Overall Configuration

Figures 3, 4:
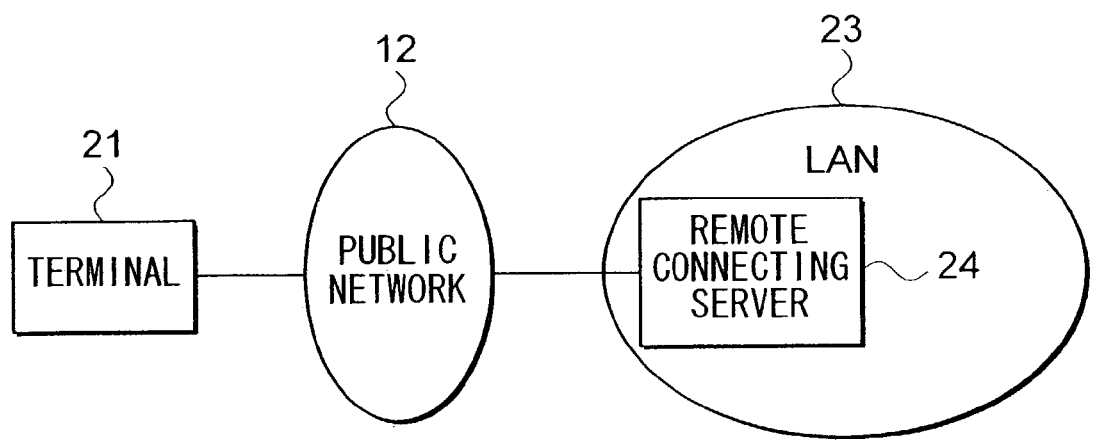
FIG. 3 is a block diagram showing a configuration of a remote access system, which has been proposed in the past.
FIG. 4 is a diagram showing a data configuration of a closed area conversion table used in the remote access system.
Figure 5:
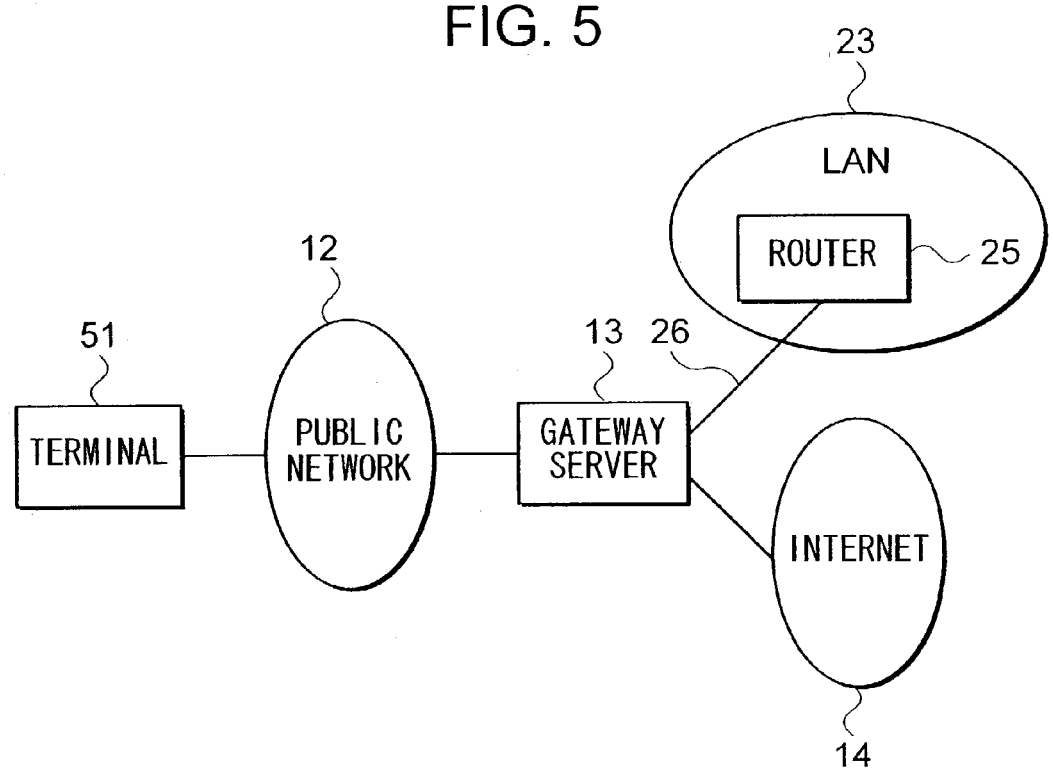
FIG. 5 is a block diagram showing a configuration of a system obtained on the basis of another system, which has been proposed in the past.
Figure 6:
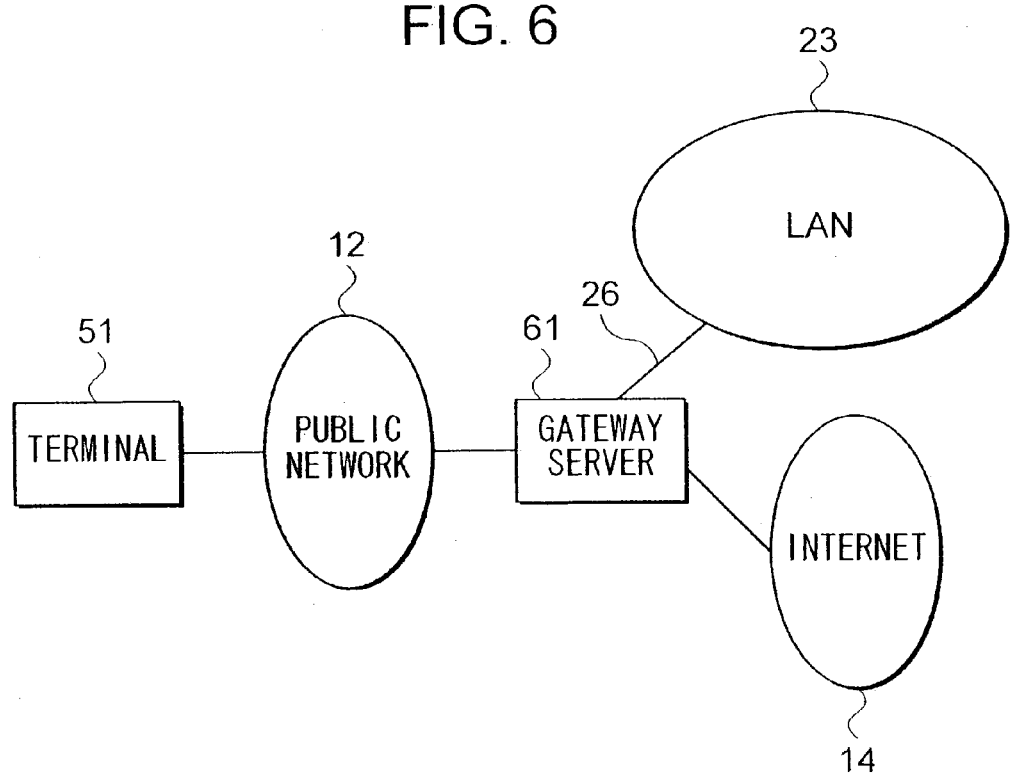
FIG. 6 is a block diagram showing a configuration of an alternative system obtained on the basis of a system, which has been proposed in the past.
Figure 7:
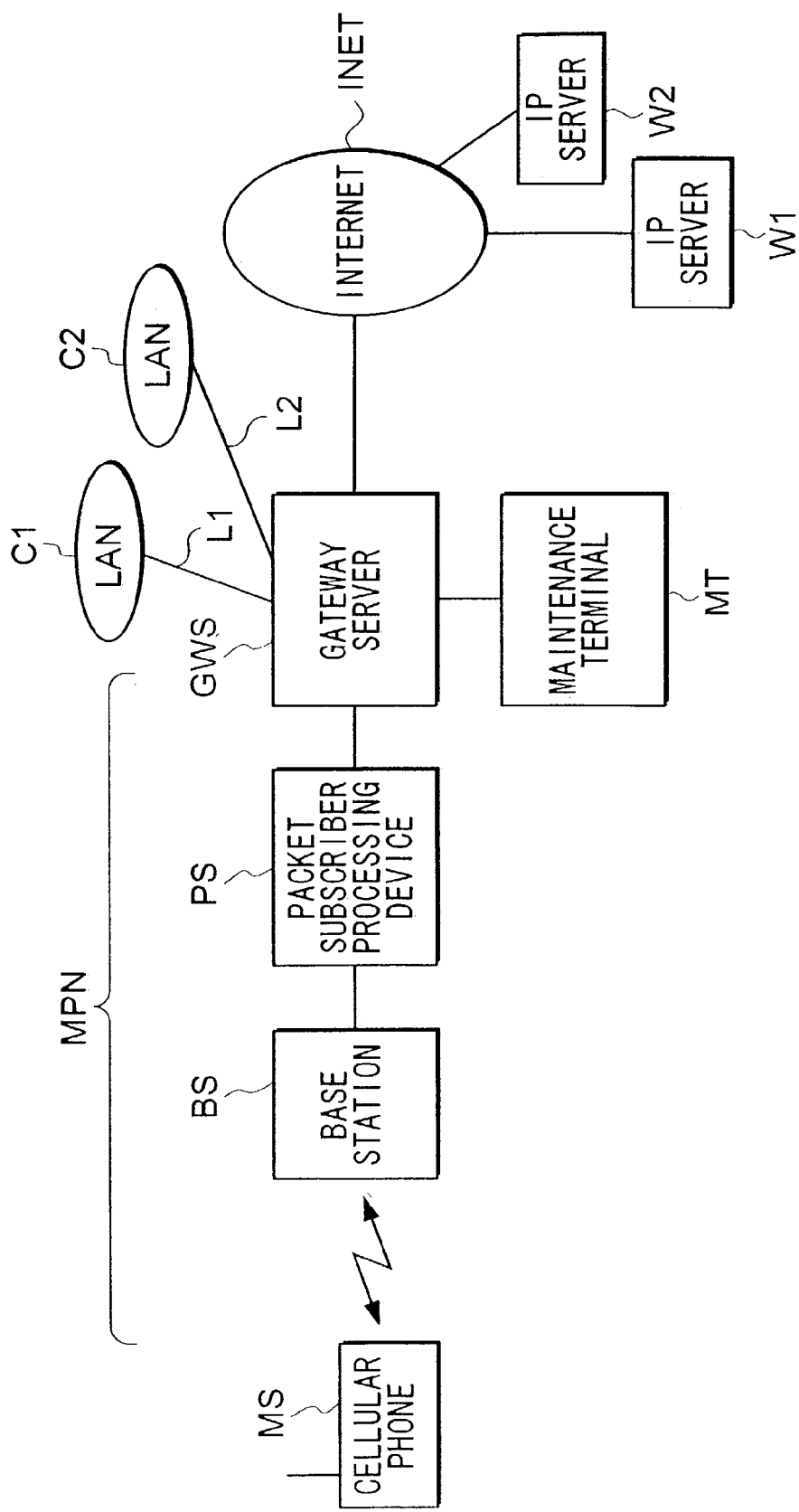
FIG. 7 is a block diagram showing an overall configuration using Gate Way Server (Relay Center) GWS according to an embodiment of the present invention.

FIG. 7 is a block diagram showing the overall configuration of a data communication system using a gateway server GWS (Relay Center) according to one embodiment of the present invention.

In the figure, a cellular phone MS is a mobile station which is entitled to a packet communication service of a mobile packet communication network MPN (connecting network), and which can be connected to mobile packet communication network MPN and to a mobile telephone network via a wireless link (not shown). Cellular phone MS has a function to access a Web server through mobile packet communication network MPN, so as to browse Web pages. Note that, the mobile telephone network is a network for providing a general mobile phone communication service, and cellular phone MS is entitled to utilize the communication service.

Mobile packet communication network MPN includes plural base stations BS, plural packet subscriber processing devices PS, a gateway server GWS, and communication lines connecting them. Base stations BS are located at predetermined intervals so as to divide a ground surface into a plurality of areas each having a radius of 500 m, for example; and each base station is able to wireless communicate with cellular phone MS which is inside a radio zone formed by the base station. Packet subscriber processing device PS is a computer system provided in a packet subscriber exchange serving multiple base stations BS. The packet subscriber processing device receives packet exchanging demands from cellular phones MS, and relays the received packets to the destination cellular phone MS through at least one of another packet subscriber processing unit and the base station served by the packet subscriber processing device. Further, the packet subscriber processing unit PS relays the packet between cellular phones MS and gateway server GWS.

Gateway server GWS is a computer system provided in a mobile packet gateway relaying/switching exchange center for interconnecting mobile packet communication network MPN, and networks such as the Internet (wide area network) INET, LAN (closed area network) C1, C2, and performs relay processing for communication, such as a protocol conversion. Protocol conversion refers to inter-conversion of a communication protocol used in a mobile packet network, and a communication protocol used in the Internet INET or LANC1, C2.

The communication protocol, to which the Internet INET responds, includes communication protocol such as TCP/IP for network and transport layers, and a communication protocol such as a HTTP utilizing TCP/IP. The communication protocol, to which mobile packet network MPN responds, includes communication protocol TL, which is a simplification of TCP/IP, and communication protocol AL, which is a subset of HTTP. Hereinbelow, description will be given with respect to communication protocols implemented in the important parts of the data communication system.

Figure 8:
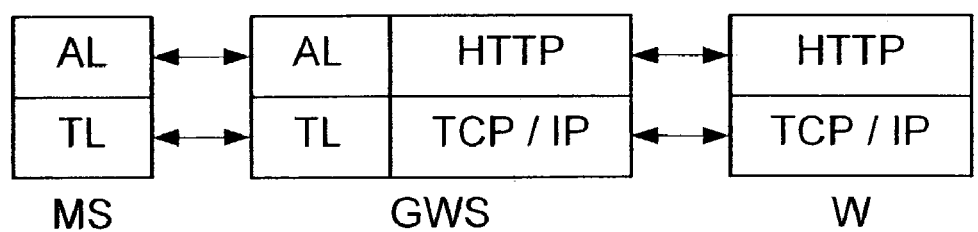
FIG. 8 is a diagram showing one aspect of a protocol configuration according to the data communication system.

FIG. 8 is a diagram showing the protocol configuration of a part of the communication data system. In the following description, if there is no need to distinguish IP server (host), the server is referred to as IP server W as shown in the figure. IP server W implements TCP/IP as a communication protocol for network and transport layers and implements HTTP as the upper layer communication protocol. On the other hand, cellular phone MS implements protocol TL as a communication protocol for network and transport layers, and implements protocol AL as an upper communication protocol. In addition, gateway server GWS implements TCP/IP and protocol TL as communication protocol for network and transport layers, and implements HTTP as the upper layer protocol of TCP/IP, and protocol AL as the upper layer protocol of protocol TL. Cellular phone MS accesses the Internet INET or LAN C1 and C2 using protocol AL.

A cellular phone implements protocols TL and AL because these protocols are designed to adapt to a data processing ability of cellular phone MS and a bandwidth provided by mobile packet communication network MPN. It is desirable to implement HTTP and TCP/IP in a system where a computer with a high data processing ability is provided as a terminal, and the terminal is connected to gateway server GWS through a broad band communication network.

A maintenance terminal MT is a terminal for maintaining/controlling gateway server GWS, comprised of general computer system. The maintenance terminal MT is operated by an administrator of gateway server GWS, and according to this operation, transmits instructions or data to gateway server GWS. The function of maintenance terminal MT which directly relates to the present invention is a function for updating a first conversion table (conversion table) T1, or a second conversion table T21, T22 on the basis of the operation of the administrator as described later.

When IP server W receives a GET demand of HTTP, it sends the contents specified by Uniform Resource Locator (URL) included in the GET demand. IP servers W1 and W2 shown in FIG. 7 are servers connected to Internet INET, and provide the contents to terminals using WWW. IP server W2 is an ordinary WWW server, and the contents provided by IP server W2 are assumed to be used by PCs. On the other hand, the contents provided by IP server W1 are assumed to be used by not only by PCs but also by cellular phones MS. The hostname and IP address (wide area IP address) of IP server W1 are stored in primary conversion table T1 of gateway server GWS. Storing the hostname and the IP address is performed when the administrator of gateway server GWS operates the maintenance terminal in accordance with a contract made between a carrier of mobile packet network MPN and an information provider having IP server W1. Otherwise, storing may be automatically performed in accordance with an online contract.

Figure 9:
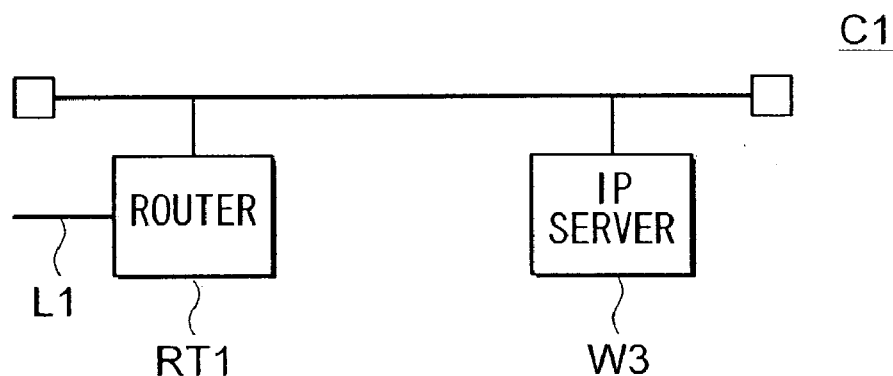
FIG. 9 is a block diagram showing a configuration of LANC 1 comprising the data communication system.
Figure 10:
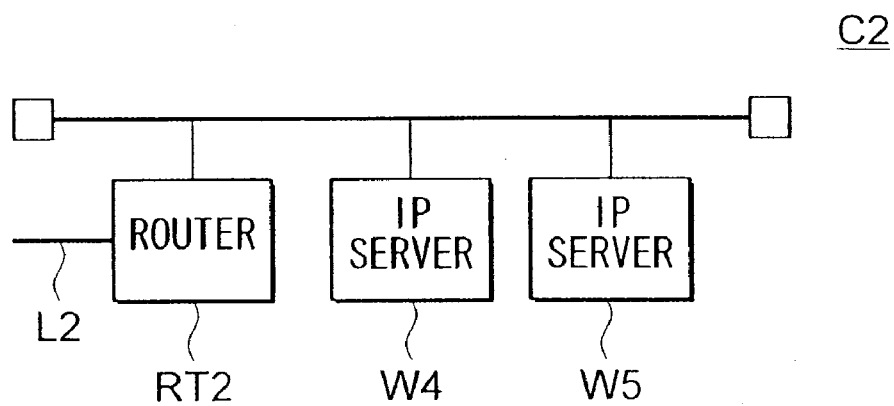
FIG. 10 is a block diagram showing a configuration of LANC 2 comprising the data communication system.

As IP servers W, there are not only IP servers W1 and W2 connected to Internet INET as mentioned above, but also IP servers provided in LANs C1 and C2. FIGS. 9 and 10 are block diagrams which show the configuration of LANs C1 and C2. As shown in these figures, IP server W3 is provided in LAN C1, and IP servers W4 and W5 are provided in LAN C2. LANs C1 and C2 are both closed area networks, and only allow access through mobile packet communication network MPN. IP servers W3 to W5 provide contents assumed to be used only for cellular phones MS. In FIGS. 9 and 10, routers RT1 and RT2 respectively route packets from dedicated lines L1 and L2 to destination hosts in LANs C1 and C2, and route packets from LANs C1 and C2 to the dedicated lines.

(2) Configuration and Function of Gate Way Server

Figure 11:
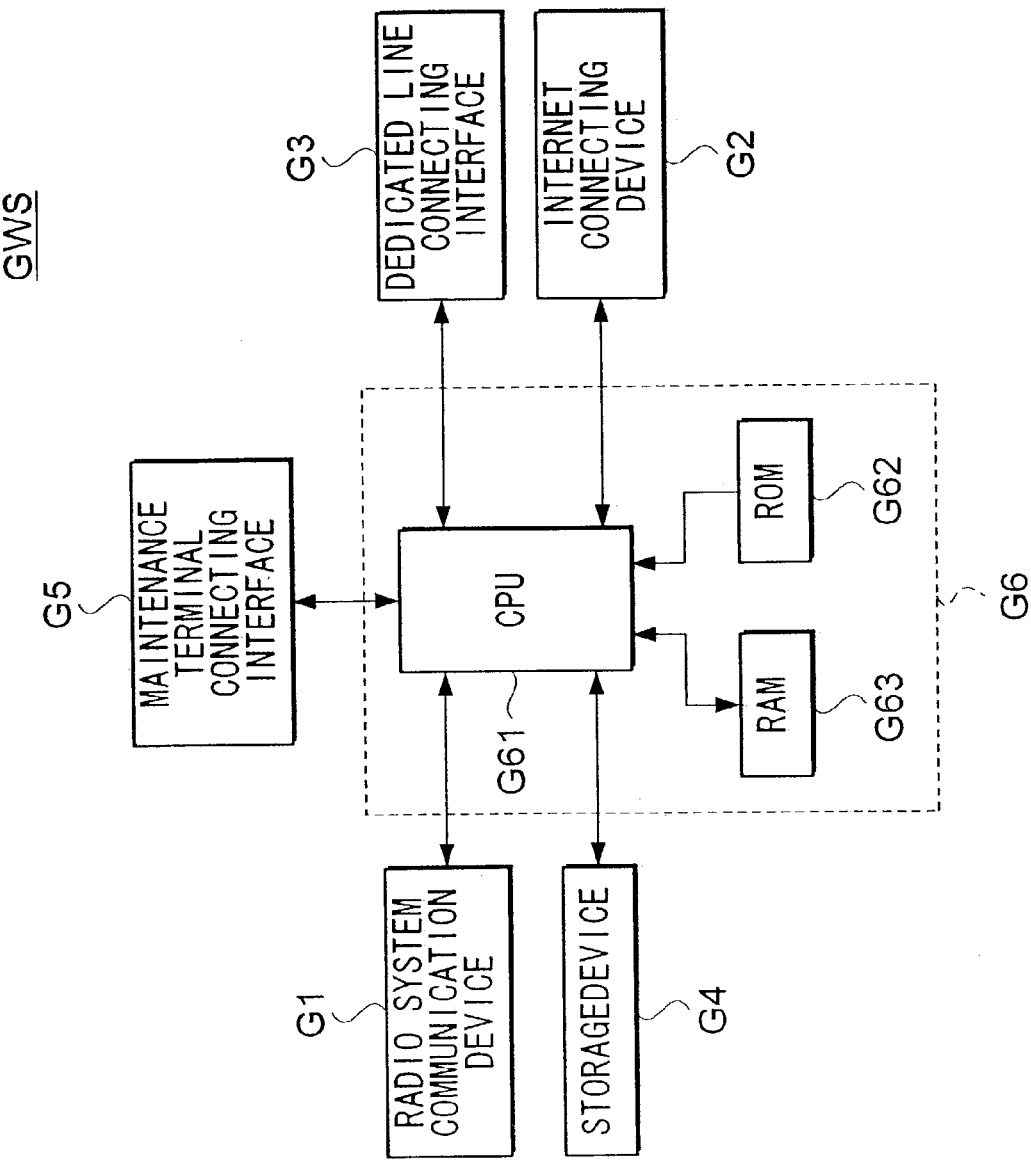
FIG. 11 is a block diagram showing a configuration of gateway server GWS comprising the data communication system.

FIG. 11 is a block diagram showing the configuration of gateway server GWS constituting the data communication system.

As shown in the figure, gateway server GWS includes a radio system communication device G1 for performing radio communication with cellular phones MS through base station BS and packet subscriber processing device PS, an Internet connecting device G2 for connecting to Internet INET, a dedicated line connecting interface G3 for connecting to dedicated lines L1 and L2, storage device G4 such as a semiconductor device or hard disk capable of storing basic programs or various tables such as T1, T21, T22 described later and capable of rewriting the stored data, a maintenance terminal connecting interface G5 for connecting to maintenance terminal MT, a controller G6 controlling each of the components of the gateway server. Radio system communication device G1 is provided as a receiver, and storage device G4 is provided as a storage unit.

Controller G6 has a CPU G61 for performing various control processes, a ROM G62 for storing a control program executed by CPU G61, and a RAM G63 used as work area of CPU G61. CPUG61 reads out and execute the control program stored in ROMG 62 to control ROM G62, RAM G63 and units G1 to G5, and read out and execute the basic program stored in storage device G4 to provide the following function.

Figure 12:
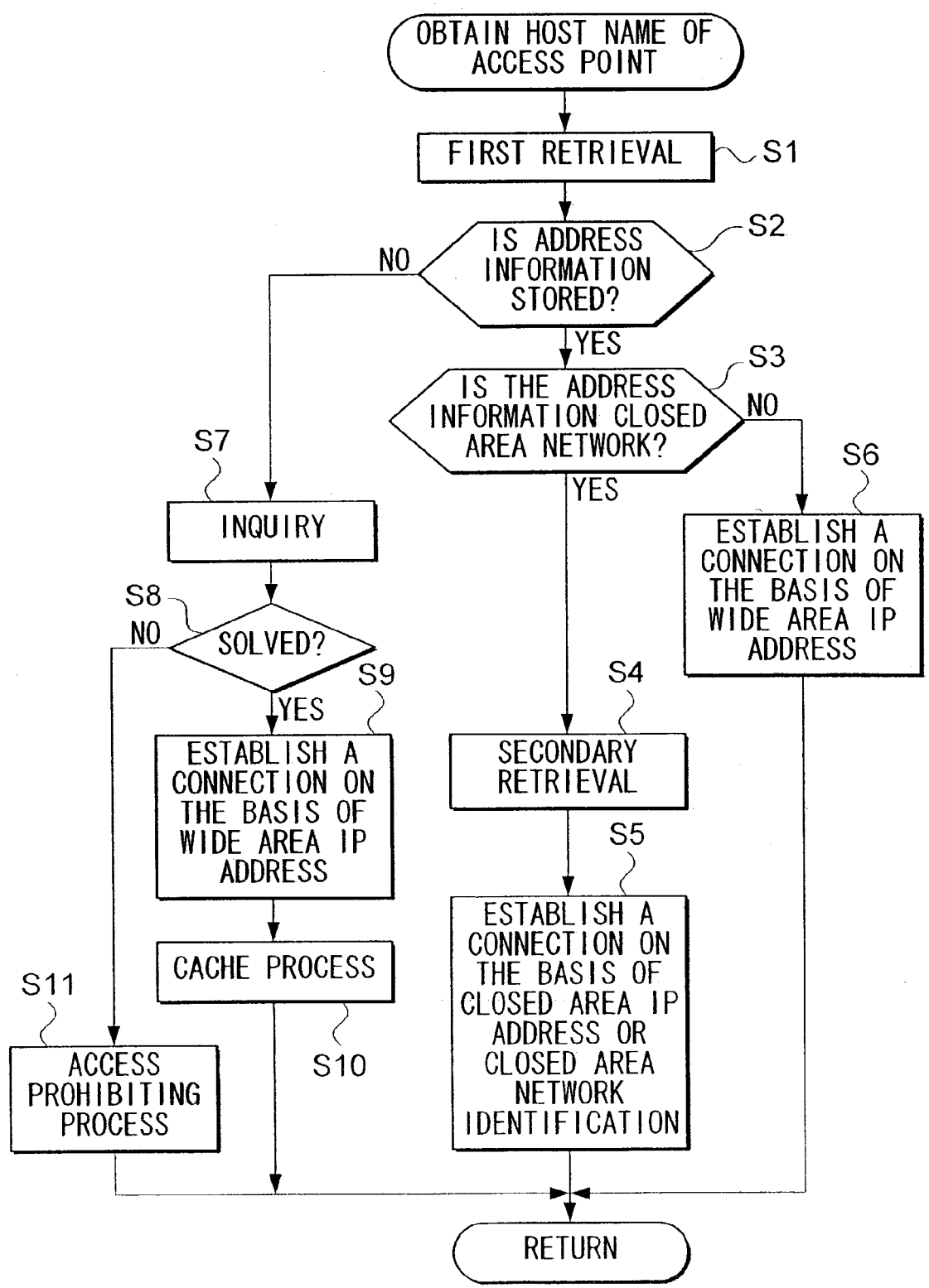
FIG. 12 is a flow chart showing an access control process (control process of access from cellular phone MS) performed by gateway server GWS.

FIG. 12 is a flow chart showing the access controlling process performed by gateway server GWS, more specifically, the controlling process for access from cellular phone MS. As shown in this figure, when gateway server GWS receives an access demand (for example, a Get demand of HTTP) from a cellular phone MS, it searches the host name of the access point included in the demand from primary conversion table T1 (step S1: first acquiring unit).

FIG. 13 is a diagram showing an example of data configuration of primary conversion table T1. As shown in the figure, first conversion table T1 stores records having "host name", "address information", and "expiration time". Each record corresponds to one host and the records in the first conversion table T1 are only those corresponding to pre-contracted IP servers W, as long as no record is added automatically by the later described cash process. "Address information" is identification of a host corresponding to a record or identification of the closed area in which the host is included. "Expiration time" is information showing an expiration time at which a retention term for the record expires. The records relating to pre-contracted IP server W are eliminated only at a time when the contract changes. Therefore, an expiration time is not set for these records, as shown in the FIG. 13.

In the example shown in FIG. 13, a record corresponding to IP server W3 includes "ip1.1an1.ccccc.co.jp" as host name, closed area identification information CID1 identifying LAN C1 (or dedicated line L1) as address information. Records corresponding to IP servers W4 and W5 also respectively include "ip1.1an2.ccccc.co.jp" and "ip2.1an2.ccccc.co.jp" as a host name, and the each record includes closed area identification information CID2 identifying LAN C2 (or dedicated line L2) as address information. The record corresponding to IP server W1 includes "keitai.aaaaa.co.jp" as a host name, wide area IP address "xxx.xxx.xxx.xxx" as address information. The data format of CID can be in any format, but it is preferable for it to be in a different data format from an IP address "xxx.xxx.xxx.xxx". Preferably, CID is for example, a 10 digit numeral sequence "xxxxxxxxxx".

When the record containing the host name of the target is found in retrieval of primary conversion table T1 (hereafter, referred to as primary retrieval), and closed area network identification is stored as address information in the record, gateway server GWS retrieves the host name of the access point from the secondary conversion table corresponding to the closed area network identification (steps S2 to S4: second acquiring unit). Judgment of whether the address in the record is a closed area network identification or a wide area IP address is based on, for example, a data format. Alternatively, judgment may be performed by pattern matching on address information stored in the record so that an address corresponding to the previously stored pattern is determined as closed area network identification information, and others as wide area IP address.

For the sake of explanation, we will suppose that as many secondary conversion tables are provided as a number of LANs connected to gateway server GWS; and in the present embodiment, secondary conversion table T21 (shown in FIG. 14) corresponding to LAN C1 and secondary conversion table T22 (shown in FIG. 15) corresponding to LAN C2 are provided.

As shown in FIGS. 14 and 15, each secondary conversion table stores records including a "host name" and "address information". Address information in each secondary conversion table is an IP address (closed area IP address) which is unique in the LAN corresponding to the table. In the secondary conversion table corresponding to LAN C1, the record corresponding to IP server W3 (the first record in secondary conversion table T21) includes closed area IP address "ppp.ppp.ppp.ppp" as address information. In the secondary conversion table corresponding to LAN C2, the records corresponding to IP servers W4 and W5 (the first and second records in secondary conversion table T22) respectively includes closed area IP addresses "ppp.ppp.ppp.ppp" and "qqq.qqq.qqq.qqq" as address information. In the example shown in the figure, closed area IP address of IP server W3 is the same as closed area IP address of IP server W4. However, as closed area IP address is an IP address valid only inside the LAN, repetition of the same closed area IP address does not cause a problem.

When a record having the host name of the destination host is found in a retrieval using the secondary conversion table (hereafter, referred to as secondary retrieval), gateway server GWS establishes a TCP connection connecting cellular phone MS and the destination host identified by closed area identification CID corresponding to the hostname and closed area IP address through gateway server GWS and the dedicated line, and transmits an access demand received from the cellular phone to the host through the established connection (step S5 in FIG. 12, closed area relay unit).

On the other hand, when a record having a hostname of the destination host is found at the primary retrieval, and a wide area IP address is stored in the found record as address information, gateway server GWS establishes a TCP connection connecting cellular phone MS to the host identified by the wide area IP address through gateway server GWS and the Internet INET. Gateway server GWS then transmits the access demand received from the cellular phone to the host, and completes the process (steps S2, S3, and S6 in FIG. 12, wide area relay unit).

When a host name of destination IP server W is not found in primary retrieval, gateway server GWS sends a request to the Internet for a wide area IP address corresponding to the host name, and receives the response (step S7). When a wide area IP address is included in the response, gateway server GWS establishes a TCP connection connecting cellular phone MS to the host identified by the wide area IP address through gateway server GWS. The Gateway server then transmits the access demand received from cellular phone MS to the host. In addition, the gateway server performs a cash process and completes all process (steps S9 and S10).

In the cash process, gateway server GWS obtains information about a holding period of time from destination IP server W, and determines an expiration time from the holding period of time. The gateway server then stores a new record comprising the determined expiration time, the host name of IP server W, and wide area IP address in primary conversion table T1. Gateway server GWS eliminates the record when the holding period of time of the record has expired.

On the contrary, when a wide area IP address is not included in the response from the Internet INET, or when gateway server GWS does not receive the response by a predetermined time limit, the gateway server performs an access prohibiting process (step S11). In the access prohibiting process, gateway server GWS informs the cellular phone that the destination IP server was not found, and discards the access demand.

(3) Operations

Next, operations relating to address conversion in a data communication system having the configuration and function described above will be explained.

(3-1) Upon Accessing IP Server W3

Figure 16:
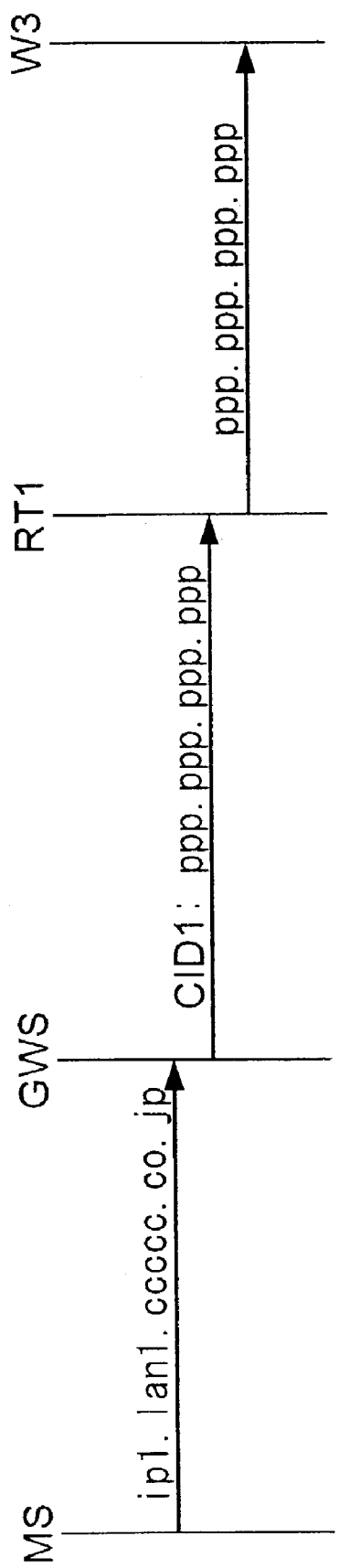
FIG. 16 is a view of an address conversion when cellular phone MS accesses IP server W3 in the data communication system.

FIG. 16 is a view showing an address conversion when a cellular phone MS accesses IP server W3. In the example shown in the figure, an access demand to IP server W3 sent from cellular phone MS to gateway server GWS includes a host name "ip1.1an1. ccccc. co. jp" of IP server W3. In gateway server GWS which has received the access demand, closed area network identification CID1 corresponding to the host name is obtained by primary retrieval using primary conversion table T1, and a closed area IP address "ppp.ppp.ppp.ppp" corresponding to the hostname is obtained by secondary retrieval using secondary conversion table T21 corresponding to closed area network identification CID1 (steps S1 to S4 in FIG. 12).

In addition, TCP connection connecting cellular phone MS to IP server W3 identified by closed area network identification CID1 and closed area IP address "ppp.ppp.ppp.ppp" through gateway server GWS and dedicated line L1 is established. The access demand from cellular phone MS is transmitted to IP server W3 from gateway server GWS through the established connection. Hereafter, communication according to HTTP (AL) is performed between cellular phone MS and IP server W3.

(3-2) Upon Accessing to IP Server W4

Figure 17:
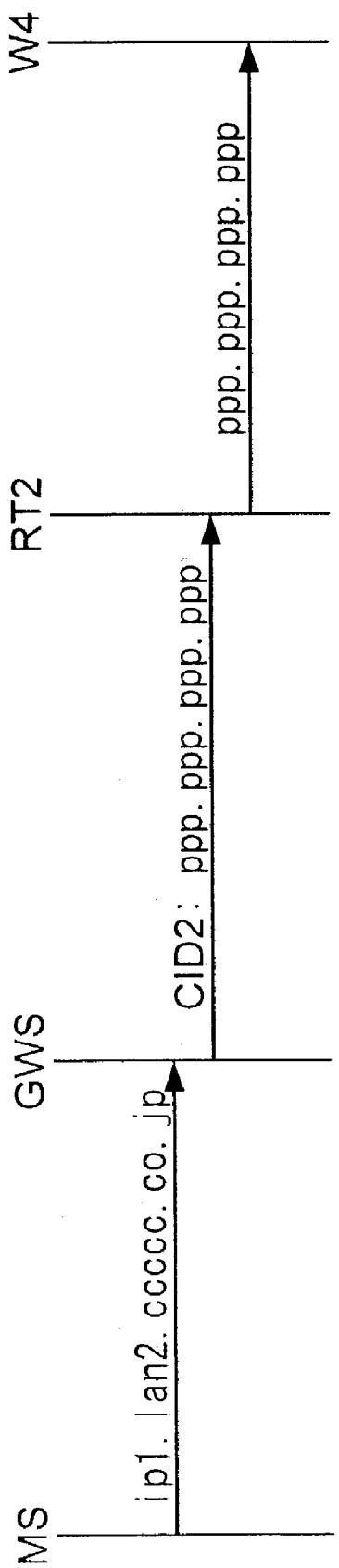
FIG. 17 is a view of an address conversion when cellular phone MS accesses IP server W4 in the data communication system.

FIG. 17 is a view showing an address conversion when cellular phone MS accesses IP server W4. In the example shown in the figure, the access demand to IP server W4 sent from cellular phone MS to gateway server GWS includes host name "ip1.1an2.ccccc. co.jp" of IP server W3. In gateway server GWS which has received the access demand, primary retrieval and secondary retrieval are performed to obtain closed area network identification CID2 and closed area IP address "ppp.ppp.ppp.ppp" corresponding to the hostname (steps S1 to S4).

In addition, TCP connection connecting cellular phone MS to IP server W4 identified by closed area network identification CID2 and closed area IP address "ppp.ppp.ppp.ppp" through gateway server GWS and dedicated line L2 is established (step S5 in FIG. 12). Since the process following the foregoing is the same as that in a case of accessing to IP server W3, explanation of it will be omitted. Furthermore, as is obvious from the present operations and the previously described operations, even if nodes on different LANs have the same closed area IP address, no problem will arise.

(3-3) Upon Accessing IP Sever W5

Figure 18:
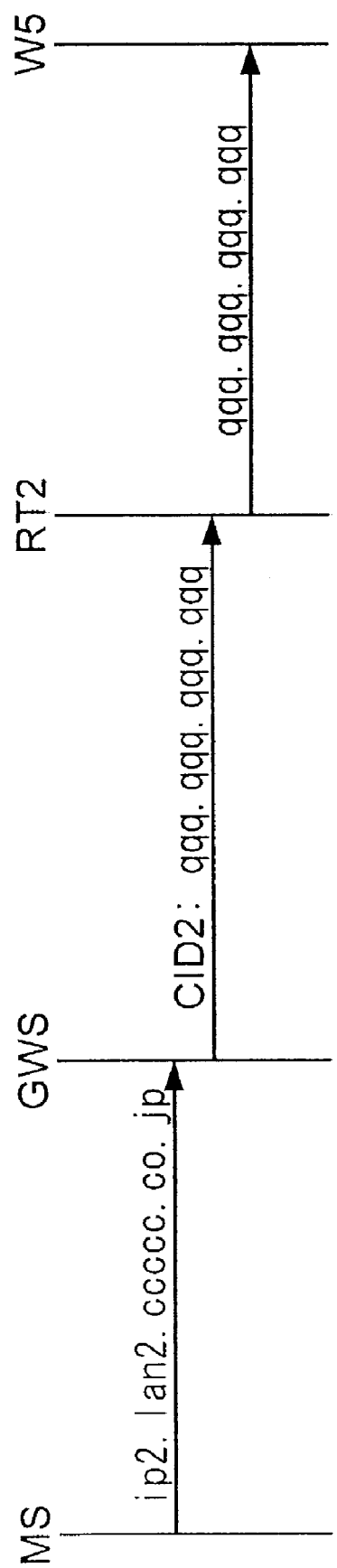
FIG. 18 is a view of an address conversion when cellular phone MS accesses IP server W5 in the data communication system.

FIG. 18 is a view showing address conversion when cellular phone MS accesses IP server W5. In the example shown in the figure, access demand to IP server W5 sent from cellular phone MS to gateway server GWS includes host name "ip2. 1an2. ccccc. co. jp" of IP server W5. In gateway server GWS which has received the access demand, a primary search and secondary search are performed, and closed area network identification information CID2 and closed area IP address "qqq.qqq.qqq.qqq" corresponding to the hostname are obtained by the retrievals (steps S1 to S4).

In addition, a TCP connection connecting cellular phone MS to IP server W5 identified by closed area network identification CID2 and closed area IP address "qqq.qqq.qqq.qqq" through gateway server GWS and dedicated line L2 is established (step S5 in FIG. 12). As is obvious from the present operations and the previously described operations, even if multiple IP servers are included in the same LAN, no problem will arise.

(3-4) Upon Accessing IP Server W1

Figure 19:
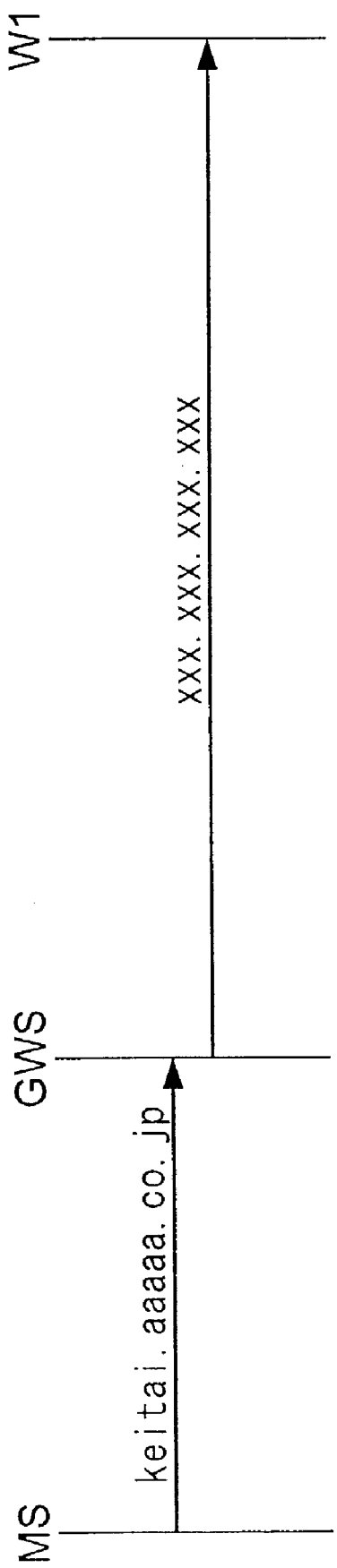
FIG. 19 is a view of the address conversion when cellular phone MS accesses IP server W1 in the data communication system.

FIG. 19 is a view showing an address conversion when cellular phone MS accesses IP server W1. In the example shown in the figure, access demand to IP server W1 sent from cellular phone MS to gateway server GWS includes a host name "keitai.aaaaa.co.jp" of IP server W1. In gateway server GWS which has received the access demand, primary retrieval is performed, and a wide area IP address "xxx.xxx.xxx.xxx" corresponding to the hostname is obtained in the retrieval (step S1 in FIG. 12).

Moreover, a TCP connection connecting cellular phone MS to IP server W1 identified by wide area IP address "xxx.xxx.xxx.xxx" through gateway server GWS and the Internet INET is established. The access demand from cellular phone MS is transmitted to IP server W1 from gateway server GWS through the established connection (steps S2, S3, and S6). Hereafter, communication according to HTTP (AL) is performed between cellular phone MS and IP server W1.

(3-5) Upon Accessing IP Server W2

Figure 20:
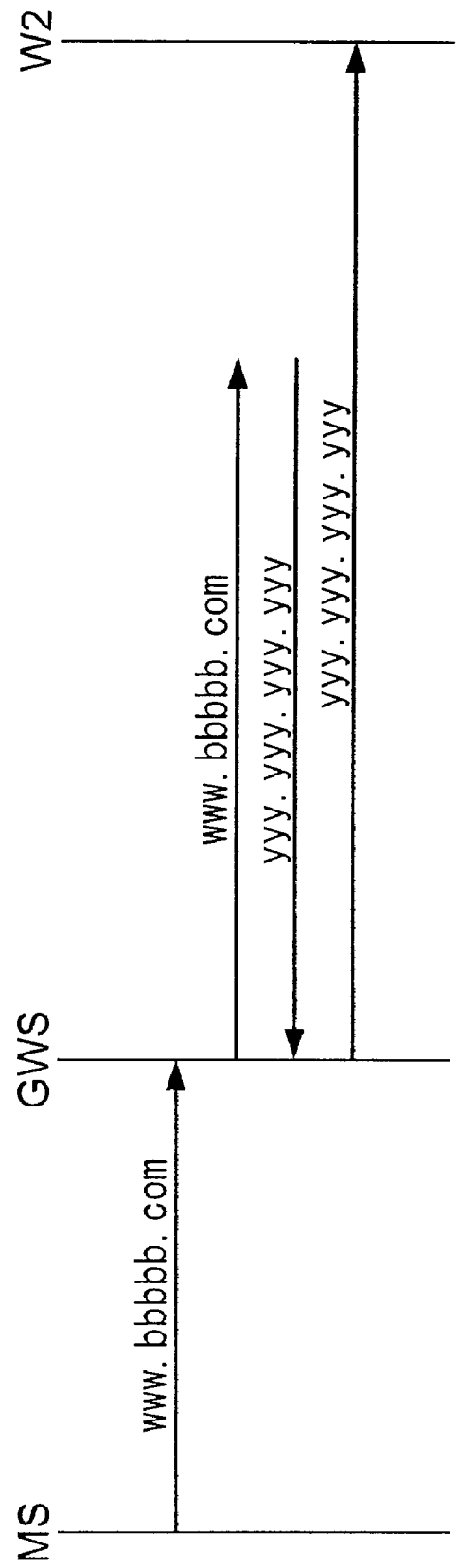
FIG. 20 is an example of a view of the address conversion when cellular phone MS accesses IP server W2 in the data communication system.

FIG. 20 is a view showing an example of address conversion when cellular phone MS accesses IP server W2. In the example shown in the figure, access demand to IP server W2 sent from cellular phone MS to gateway server GWS includes a hostname "www.bbbbb.com" of IP server W2.

In the case that a record having "www.bbbbb.com" as a hostname is not stored in primary conversion table T1, an inquiry requesting a wide area IP address corresponding to the hostname is send to Internet INET by gateway server GWS. As IP server W2 is a real server connected to Internet INET, the inquiry is solved and wide area IP address "yyy.yyy.yyy.yyy" of IP server W2 is announced to gateway server GWS (steps S1, S2, and S7 in FIG. 12).

Then, TCP connection through gateway server GWS and Internet INET is established between IP server W2, identified by wide area IP address "yyy.yyy.yyy.yyy" described above, and cellular phone MS. The access demand from cellular phone MS is transmitted from gateway server GWS to IP server W2 through the established connection (steps S8 and S9). Hereafter, communication according to HTTP (AL) is performed between cellular phone MS and IP server W2.

At this stage, a cash process relating to IP server W2 (step S10) is also performed and a new record having expiration time (for example, 13:15 Jul. 30, 2000) determined based on the holding term obtained from IP server W2, hostname "www.bbbbb.com", and wide area IP address "yyy.yyy.yyy.yyy", is stored in primary conversion table T1 (refer to FIG. 21).

On the contrary, when an access demand including hostname "www.bbbbb.com." of IP server 2 is sent to gateway server GWS from a cellular phone MS under a condition in which the primary conversion table is in the condition shown in FIG. 21, since a record having "www.bbbbb.com" as a hostname exists in primary conversion table T1, the same operation is carried out as when the cellular phone MS accesses the IP server W1 (steps S1 to step3, and S6 in FIG. 12).

In gateway server GWS, the record relating to IP server W2 would be eliminated from primary conversion table T1 on 13:15 Jul. 30, 2000.

(3-6) Upon Accessing a Non-Existent IP Server

Finally, description will be given with respect to an operation performed when access demand to the IP server sent from cellular phone MS to the gateway server GWS includes a host name of non-existing IP server. In this case, even if the primary retrieval is performed and inquiry is issued to the Internet INET, the wide area IP server cannot be obtained (steps S1, S2, and S7). Therefore, notification that the destination IP server is not found is announced to cellular phone MS from the gateway server GWS (steps S8 and S11).

As explained above, the relay apparatus of the present invention judges whether the destination host in communication is in wide area network or in closed area network, then specifies the hostname of host. By conducting two-stage retrieval, the hostname is efficiently obtained. Accordingly, regardless of the destination host on the wide area network or on the closed area network, communication between terminal and host can be relayed. In addition, since a wide area IP address is not assigned to the closed area network, information from the wide area network will not enter the closed area network. Accordingly, there is no need to take high security countermeasures to prevent unfair access, and joining an service provider is greatly facilitated. Further, since it is possible to provide a complete bandwidth of a communication channel between the closed area network and the relay apparatus for communication with a terminal, the host and a terminal user on the closed area network are able to receive a high quality service.

Preferably, the records relating to the closed area networks are stored in areas of the conversion table from which records are read out early in the retrieval process. In this embodiment, retrieval of a hostname can be efficiently performed. This is because, records relating hosts in closed area networks which are fewer than those in wide area networks are first subject to retrieval. If a negative determination is made, records relating to wide area networks will then be subject to retrieval.

(4) Supplements

Cellular phones are information processing terminals which are in more widespread use as compared to PCs, and it is expected that a large number of users will receive data communication services through a gateway server GWS. In general, cost performance resulting from improvements in throughput of gateway server GWS can progress only to a certain level, and when cost performance exceeds that level, the service is significantly degraded. In view of this, since the gateway server in the communication system according to the present invention is able to perform the inquiring process of host name efficiently, as compared to the conventional relay system, it is possible to keep the cost for relaying communication low and to provide a communication system capable of serving a large number of users.

In addition, since there are a great number of potential users, and information processing ability of a cellular phone MS is still lower than a PC, and also since mobile packet network MPN has a narrow band and a high delay, it is expected that a large number of carriers will emerge who provide a service dedicated to cellular phones. In that case, improving relaying efficiency by means of the data communication system described above would have an exponential effect.

It is to be noted here that the present invention is in no way limited to the concrete configuration described in the above embodiment, and is susceptible to a variety of modifications within the scope of the appended claims.

What is claimed is:

1. A relay apparatus to be connected to a terminal connected to a network, a host on a closed area network, and a host on a wide area network, the relay apparatus comprising:
   a storage unit for storing a primary conversion table having a record correlating a hostname of a host on the wide area network with a wide area address and a record correlating a hostname of a host on the closed area network with a closed area network identification, and a secondary conversion table having a record correlating a hostname of a host on the closed area network with a closed area address of the host in the closed area network;
   a receiver for receiving an access demand to a host from the terminal through the network;
   a first acquiring unit for acquiring information corresponding to a hostname included in the received access demand from the primary conversion table;
   a wide area relay unit for, when information acquired by the first acquiring unit is a wide area address, relaying the access demand to a host specified by the wide area address;
   a second acquiring unit for, when information obtained by the first acquiring unit is an closed area network identification, acquiring a closed area address in the closed area network, the closed area address corresponding to the hostname included in the access demand from the secondary conversion table; and
   a closed area relay unit for relaying the access demand to the host specified by the identification acquired by the first acquiring unit and the closed area address acquired by the second acquiring unit.

2. A relay apparatus according to claim 1, wherein the storage device stores a record correlating the host name of the host on the closed area network with the closed area network identification in an area which is first subjected to retrieval, and stores the record correlating the hostname of the host on the wide area network with the wide area address in an area which is next subjected to retrieval.

3. A relay apparatus according to claim 1, wherein the terminal is a cellular phone.

4. A relay apparatus according to claim 2, wherein the terminal is a cellular phone.

* * * * *